United States Patent
Denietolis, Jr. et al.

(10) Patent No.: US 7,116,236 B2
(45) Date of Patent: *Oct. 3, 2006

(54) OIL TANK SIGHT GLASS MONITOR

(75) Inventors: Anthony F. Denietolis, Jr., Falmouth, MA (US); James G. Burke, III, Londonderry, NH (US)

(73) Assignee: Antron Engineering & Machine Co., Inc., Bellingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,592

(22) Filed: May 24, 2004

(65) Prior Publication Data

US 2005/0007253 A1 Jan. 13, 2005

Related U.S. Application Data

(63) Continuation of application No. 10/017,943, filed on Dec. 13, 2001, now Pat. No. 6,753,785.

(60) Provisional application No. 60/255,306, filed on Dec. 13, 2000.

(51) Int. Cl.
*G08B 21/00* (2006.01)

(52) U.S. Cl. ............... 340/619; 340/623; 340/624; 73/290 R; 73/293; 200/61.02; 200/61.2; 221/51; 250/577

(58) Field of Classification Search ........ 340/619, 340/618, 623, 624, 612; 73/323, 624, 290 R, 73/293; 250/577; 200/61.02, 61.2; 222/51
See application file for complete search history.

(56) References Cited

U.S. PATENT DOCUMENTS

| | | | |
|---|---|---|---|
| 4,014,010 A | 3/1977 | Jinotti | |
| 4,084,436 A | 4/1978 | Smitherman | |
| 4,290,059 A | 9/1981 | Noyes et al. | |
| 4,440,022 A * | 4/1984 | Masom | 73/293 |
| 4,473,730 A | 9/1984 | Ida | |
| 4,665,391 A * | 5/1987 | Spani | 340/619 |
| 4,736,077 A | 4/1988 | Valente | |
| 5,154,079 A | 10/1992 | Lupoli | |
| 5,166,667 A * | 11/1992 | Jen | 340/606 |
| 5,501,255 A | 3/1996 | Tortu et al. | |
| 5,950,487 A * | 9/1999 | Maresca et al. | 73/293 |
| 5,996,402 A | 12/1999 | Harris | |
| 6,012,606 A * | 1/2000 | Harris et al. | 222/51 |
| 6,118,134 A * | 9/2000 | Justak | 250/577 |
| 6,195,012 B1 * | 2/2001 | Yang | 340/618 |
| 6,237,420 B1 | 5/2001 | Rowlette et al. | |
| 6,336,362 B1 | 1/2002 | Duenas | |
| 6,581,461 B1 * | 6/2003 | Diaz | 250/577 |

\* cited by examiner

*Primary Examiner*—Davetta W. Goins
(74) *Attorney, Agent, or Firm*—Pandiscio & Pandiscio

(57) ABSTRACT

An oil tank sight glass monitor comprising a housing having an opening therein sized to receive the sight glass of an oil tank; an emitter for emitting a beam of light, the emitter being mounted to the housing on one side of the opening so that the beam of light is directed across the opening; a detector for detecting the beam of light generated by the emitter, the detector being mounted to the housing on the other side of the opening, in optical alignment with the emitter, so as to detect the beam of light emitted by the emitter; and an alarm for producing an audible sound when the detector fails to detect the beam of light generated by the emitter.

4 Claims, 5 Drawing Sheets

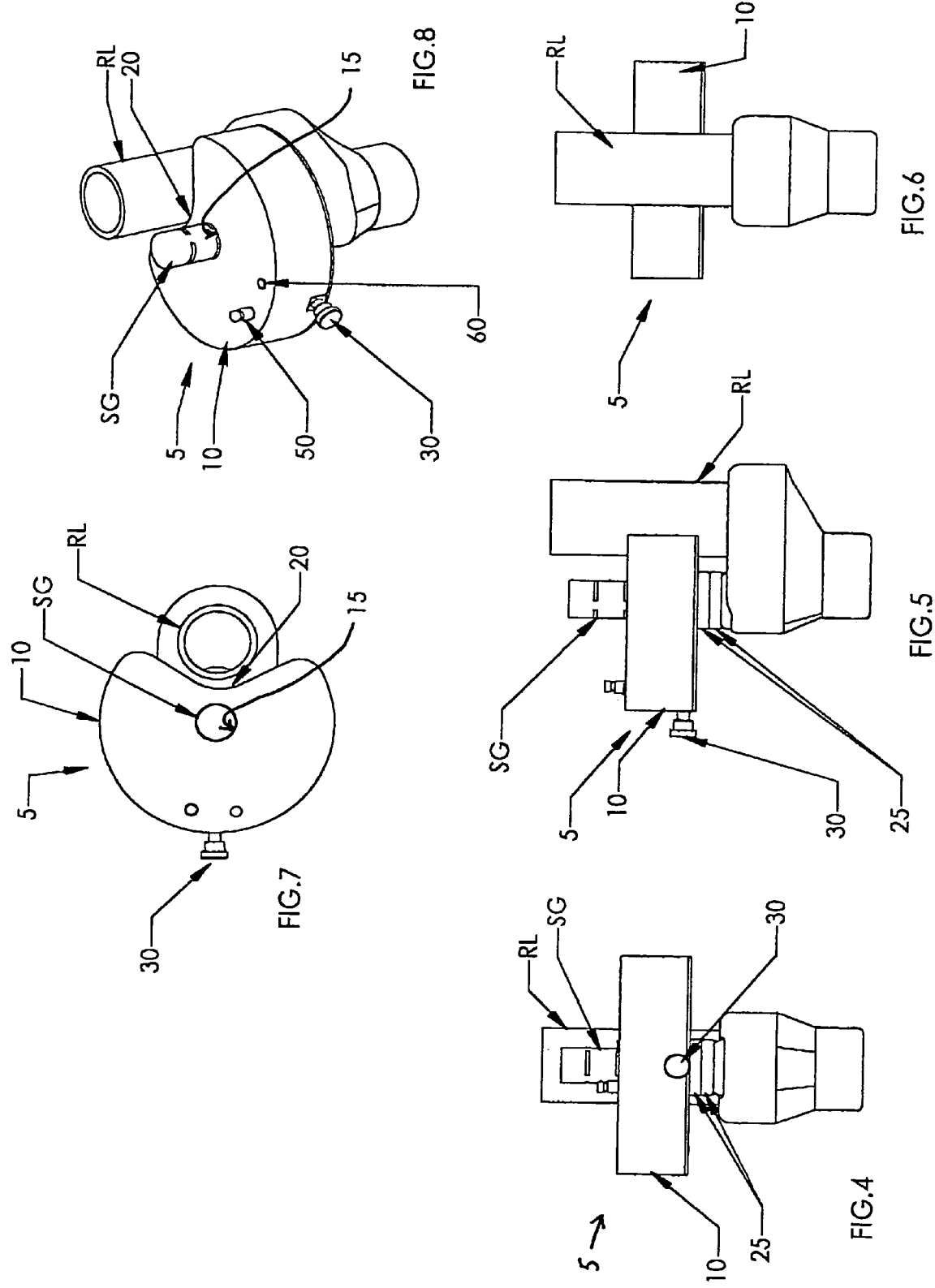

OIL TANK SIGHT GLASS MONITOR

REFERENCE TO PENDING PRIOR PATENT APPLICATION

This is a continuation of pending prior U.S. Patent Application Serial No. 10/017,943 now U.S. Pat. No. 6,753,785, filed Dec. 13, 2001 by Anthony F. Denietolis, Jr. et al. for OIL TANK SIGHT GLASS MONITOR, which in turn claims benefit of U.S. Provisional Patent Application Ser. No. 60/255,306, filed Dec. 13, 2000 by Anthony F. Denietolis, Jr. et al. for OIL TANK DETECTOR, which patent application is hereby incorporated herein by reference.

FIELD OF THE INVENTION

This invention relates to heating systems in general, and more particularly to oil-based heating systems.

BACKGROUND OF THE INVENTION

Many home heating systems use oil as their fuel. In the typical situation, the oil furnace and its associated oil tank are located in the basement of the house, with heat being delivered to the upstairs living spaces by hot water circulated through radiators or hot air discharged through vents.

The oil tanks typically have a refill line which extends from the oil tank up to the side of the house, where the refill line can be accessed for refilling by an oil truck. In addition, the oil tanks typically have a fuel level gauge, commonly called a sight glass, on the top of the tank to show how much oil is in the oil tank.

More particularly, and referring now to FIGS. 1–3, there is shown a conventional oil tank sight glass SG. Sight glass SG is transparent and contains a moving indicator MI which is supported by a shaft S which is in turn attached to a float (not shown) located in the oil tank (not shown). The height of moving indicator MI within sight glass SG corresponds to the height of the oil in the oil tank: as the level of the oil in the oil tank decreases, the height of moving indicator MI drops within sight glass SG.

The foregoing arrangement provides a simple, reliable and economical means for indicating the amount of oil present in the oil tank. Unfortunately, however, this arrangement also suffers from the fact that it is limited to line of sight. Thus, where the oil tank is located in the basement of a house, a person must go down to the basement in order to check on the level of oil in the oil tank. This can be inconvenient and may lead to a failure to regularly monitor the level of oil in the oil tank, which may in turn result in accidentally depleting all of the oil in the oil tank.

SUMMARY OF THE INVENTION

As a result, one object of the present invention is to provide novel apparatus for monitoring the level of oil in an oil tank.

Another object of the present invention is to provide novel apparatus for monitoring the level of oil in an oil tank, wherein the apparatus is simple, reliable and economical.

And another object of the present invention is to provide novel apparatus for monitoring the level of oil in an oil tank, wherein the apparatus may be quickly and easily used in conjunction with conventional oil tank sight glasses without requiring any retrofit.

In accordance with the present invention, there is provided a novel oil tank sight glass monitor to optically monitor an oil tank sight glass such that when the moving indicator falls to a certain level, indicating that the level of oil in the oil tank has fallen to a certain level, the moving indicator will block an optical beam generated by an emitter and prevent that optical beam from being received by an associated detector. When the beam is blocked in this manner, it triggers an audible alarm that sounds until the monitor is manually reset. Preferably the monitor's power source comprises batteries contained within the monitor, so that the monitor does not need an electrical power line to extend to the monitor. In addition, the monitor is preferably programmed so as to only activate the emitter and detector periodically, with the monitor assuming a "sleep" mode between theses periods of activation, so as to conserve power.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 4 is a front view showing a novel oil tank sight glass monitor positioned about an oil tank sight glass;

FIG. 5 is a side view showing a novel oil tank sight glass monitor positioned about an oil tank sight glass;

FIG. 6 is a rear view showing a novel oil tank sight glass monitor positioned about an oil tank sight glass;

FIG. 7 is a top view showing a novel oil tank sight glass monitor positioned about an oil tank sight glass;

FIG. 8 is a perspective view showing a novel oil tank sight glass monitor positioned about an oil tank sight glass;

DETAILED DESCRIPTION OF THE PREFERRED EMBODIMENTS

Figure 3:
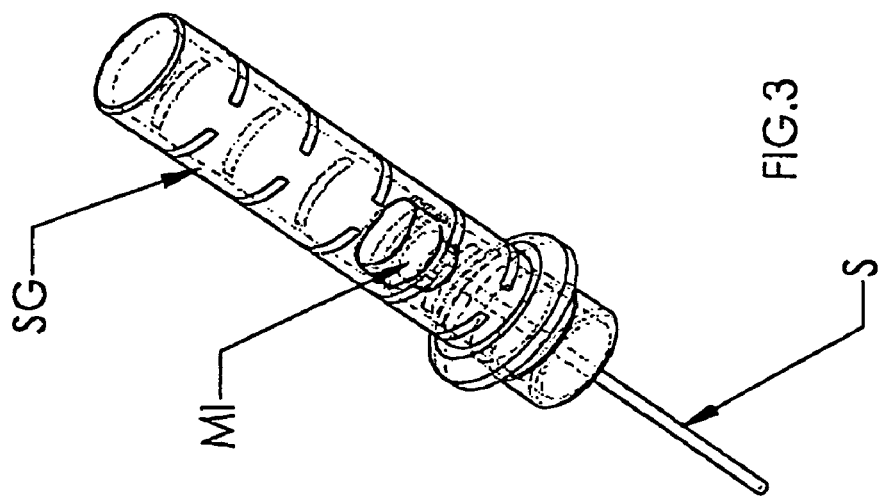
FIG. 3 is a perspective view of the sight glass shown in FIG. 1.
Figure 2:
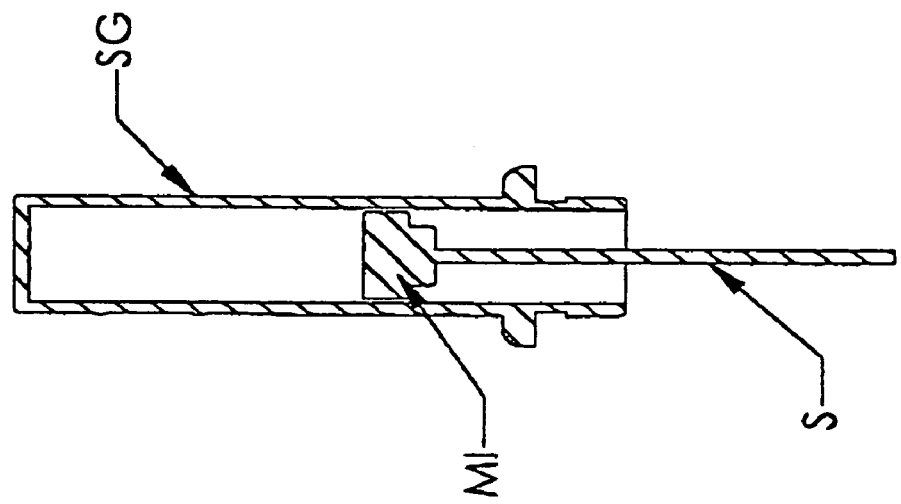
FIG. 2 is a sectional view taken along line A—A of FIG. 1.
Figure 1:
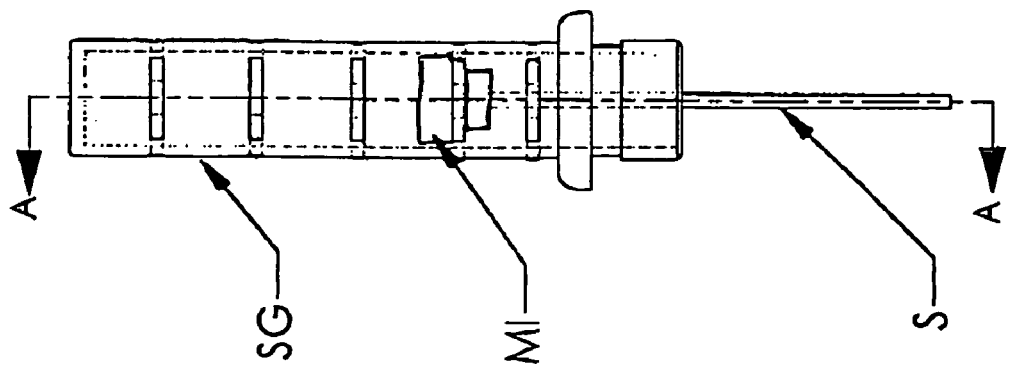
FIG. 1 is a side view of a conventional oil tank sight glass.

Looking next at FIGS. 4–8, there is shown an oil tank sight glass monitor 5. Monitor 5 generally comprises a housing 10 having an opening 15 (FIGS. 7 and 8) extending therethrough. Opening 15 is sized so as to receive the sight glass SG of an oil tank. The rear side of housing 10 may be recessed, as shown at 20 (FIGS. 7 and 8), so as to enable housing 10 to be set about sight glass SG without engaging with the oil tank's refill line RL.

In essence, housing 10 drops over a pre-existing sight glass SG with no tools required. Housing 10 can be set in height for various levels, such as ⅛", ¼", ½", ¾", etc., by the use of spacers 25 (FIGS. 4 and 5) which are preferably supplied with monitor 5 and positioned about sight glass SG beneath monitor 5. A nylon thumb screw 30 is also provided to fix housing 10 against sight glass SG at varying heights. The diameter of opening 15 is designed to accept a standard "large diameter" sight glass SG therein; in addition, nylon screw 30 has a length adequate to accommodate a smaller diameter sight glass SG.

Figure 13:
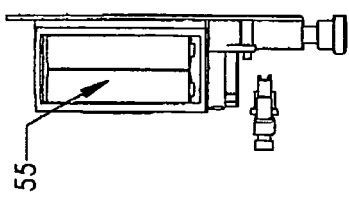
FIG. 13 is a side sectional view taken along line C—C of FIG. 9.
Figure 12:
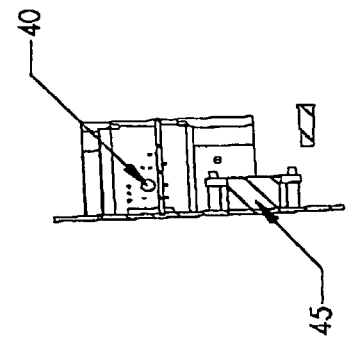
FIG. 12 is a side sectional view taken along line B—B of FIG. 9.
Figure 9:
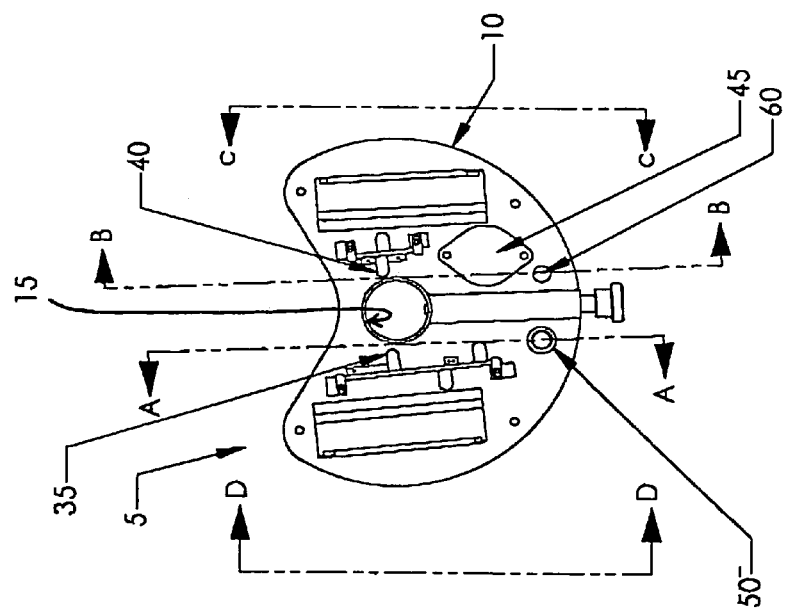
FIG. 9 is a top view showing the interior components of the oil tank glass monitor shown in FIGS. 4–9.
Figure 11:
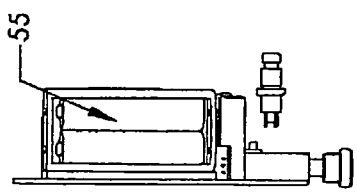
FIG. 11 is a side sectional view taken along line D—D of FIG. 9.
Figure 10:
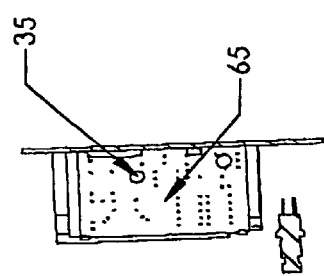
FIG. 10 is a side sectional view taken along line A—A of FIG. 9.
Figure 14:
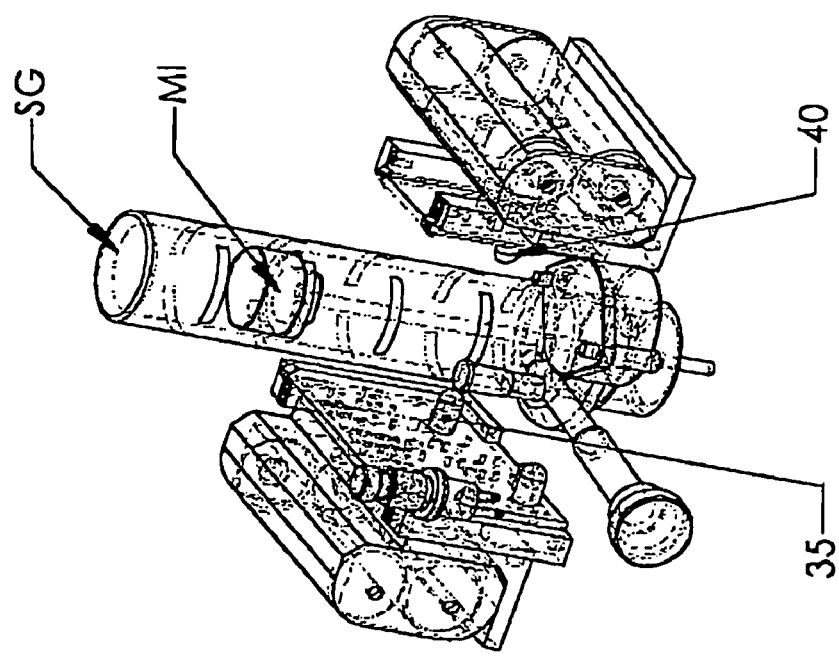
FIG. 14 is a perspective view of selected components of the oil tank sight glass monitor positioned about an oil tank sight glass, with the moving indicator of the sight glass being shown in a raised position.
Figure 16:
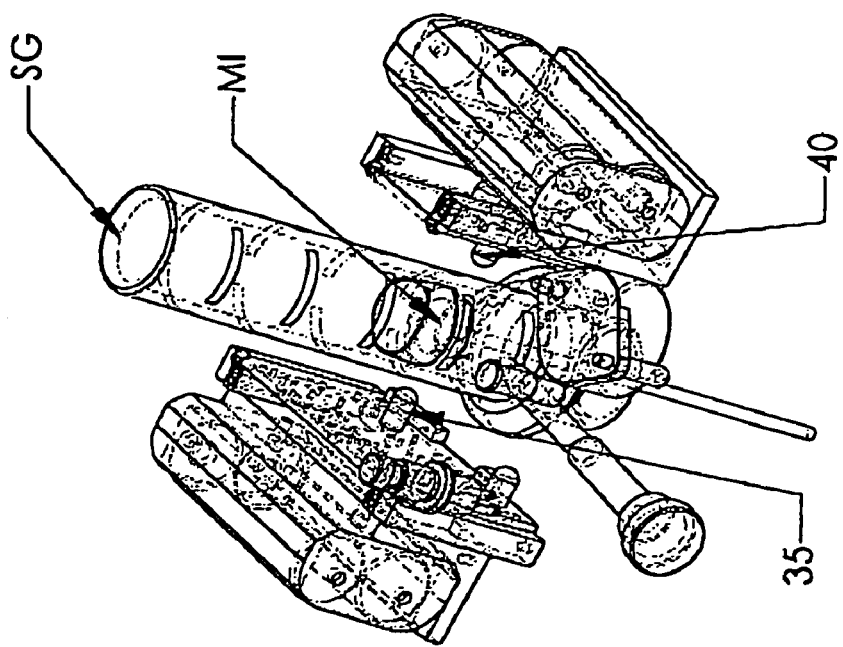
FIG. 16 is a perspective view of selected components of an oil tank sight glass monitor positioned about an oil tank sight glass, with the moving indicator of the sight glass being shown in a fallen position.
Figure 15:
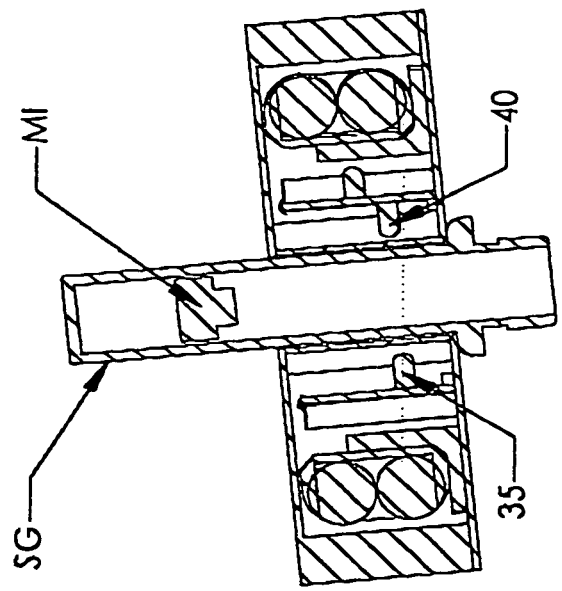
FIG. 15 is a side sectional view showing an oil tank sight glass monitor positioned about an oil tank sight glass, with the moving indicator of the sight glass being shown in a raised position.
Figure 17:
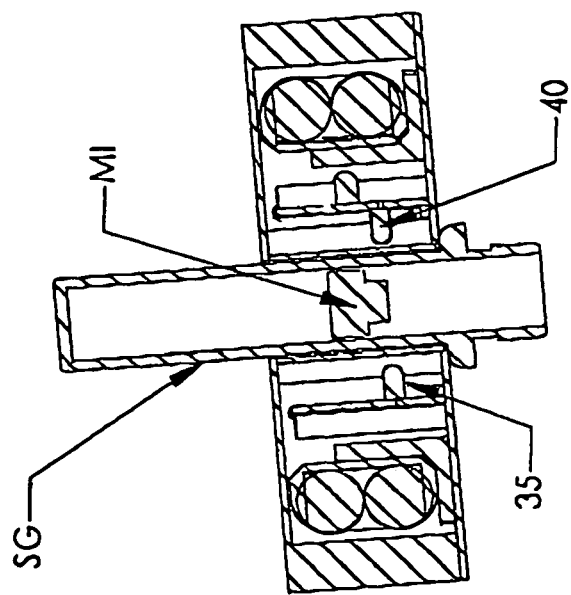
FIG. 17 is a side sectional view showing an oil tank sight glass monitor positioned about an oil tank sight glass, with the moving indicator of the sight glass being shown in a fallen position.

Looking next at FIGS. 9–17, detector unit 5 also comprises an optical emitter 35, an optical detector 40, an alarm 45, a test button 50, a 6 volt battery power source 55, a low battery LED 60, and a controller 65.

Optical emitter 35 is adapted to emit a beam of light. Emitter 35 is mounted to housing 10 on one side of opening 15 (FIG. 9) so that the beam of light generated by emitter 35 is directed across opening 15.

Optical detector 40 is adapted to detect the beam of light generated by emitter 35. Detector 40 is mounted to housing 10 on the other side of opening 15 (FIG. 9), in optical alignment with emitter 35, so as to detect the beam of light emitted by emitter 35.

Emitter 35 and detector 40 may operate at any desired wavelength. In one preferred form of the invention, emitter 35 and detector 40 are configured to operate at a wavelength within the infrared (IR) band.

Monitor 5 also comprises controller 65, located on one or more of the elements of the monitor, for controlling operation of the monitor as will hereinafter be described. By way of example but not limitation, controller 65 may be mounted on the board carrying emitter 35.

When first setting up monitor 5, the user slides housing 10 over sight glass SG (FIGS. 14 and 15), setting the proper height for the unit (i.e., with spacers 25 and/or nylon screw 45). At this point the user pushes test button 50 to activate the monitor as well as to run a diagnostic cycle. This causes emitter 35 and detector 40 to go into their active mode, with emitter 35 emitting a beam of light and detector 40 testing for the presence of that beam. The unit is programmed so that it will sound its alarm 45 if the beam of light is not detected by detector 40. Thus, if test button 50 is pushed and alarm 45 sounds, housing 10 must be rotated in a clockwise or counter-clockwise rotation until alarm 45 stops sounding. When detector 40 senses the optical beam from emitter 35, there is a clear path for the optical beam through sight glass SG and alarm 45 will emit no sound, thus indicating that monitor 5 is set to a functional mode.

Monitor 5 may be programmed so that it is continually in an active state (i.e., with emitter 35 and detector 40 activated). More preferably, however, monitor 5 is programmed so that it will only activate emitter 35 and detector 40 periodically, with the monitor assuming a "sleep" mode in between these periods of activation. This is to conserve battery power. In one preferred form of the invention, monitor 5 is programmed to activate emitter 35 and detector 40 four times daily. Alternatively, monitor 5 may be programmed to activate at different time periods.

If there is an interruption in the optical path between emitter 35 and detector 40, which is caused by moving indicator MI falling inside of sight glass SG (FIGS. 16 and 17), then alarm 45 will sound until it is manually reset. Thus, monitor 5 will alert occupants to ensure that the oil tank is timely refilled.

Power source 55 is preferably a battery power source, so that the monitor does not need an electrical power line to extend to the monitor. A low battery LED 60 is provided to show when power source 55 runs low on power.

In some circumstances the oil tank (and hence oil tank monitor 5) may be located outside of the normal hearing range of the occupants. An example of this is where the oil tank (and oil tank monitor 5) is located in the basement of a multifamily house and the occupants are located several stories above the basement. In such a situation, when the monitor's alarm 45 sounds in the basement, it may not be heard by occupants several floors away. An alternative embodiment of the invention is provided to address this situation. In this alternative embodiment, when the optical beam of emitter 35 is blocked by moving indicator MI falling within sight glass SG, alarm 45 sends out an RF frequency signal. This RF frequency signal is received by an RF frequency receiver (not shown) provided in the living area of the house, and this RF frequency receiver generates an audible alarm which can then be heard by the occupants. In this alternative embodiment of the invention, when the monitor's low battery LED 60 is triggered, the circuit preferably sends out an RF frequency signal to light up a corresponding low battery LED on the RF receiver, and/or to set off an audible alarm on the RF receiver, so as to let occupants know that the batteries in monitor 5 need to be replaced. To the extent that monitor 5 is configured to send out an RF signal, it is preferred that this RF signal be in the form of a unique, or relatively unique, digital signal so as to minimize interference with units in an adjacent household.

What is claimed is:

1. An oil tank sight glass monitor comprising:
   a housing having an opening therein sized to receive the sight glass of an oil tank;
   an emitter for emitting a beam of light, said emitter being mounted to said housing on one side of said opening so that said beam of light is directed across said opening;
   a detector for detecting said beam of light generated by said emitter, said detector being mounted to said housing on the other side of said opening, in optical alignment with said emitter, so as to detect said beam of light emitted by said emitter; and
   an alarm for producing an audible sound when said detector fails to detect said beam of light generated by said emitter.

2. An oil tank sight glass monitor according to claim 1 further comprising a controller for controlling the operation of said emitter and said detector.

3. An oil tank sight glass monitor according to claim 2 wherein said controller is configured so that it will only activate said emitter and said detector periodically, with said monitor assuming a sleep mode between these periods of activation.

4. An oil tank sight glass monitor according to claim 1 wherein said alarm comprises an RF transmitter and an RF receiver, said RF transmitter being located in said housing and said RF receiver being located in a second housing to be disposed at a remote location, and further wherein said RF transmitter sends an RF signal to said RF receiver when said detector fails to detect said beam of light, whereby said RF receiver will produce an audible sound.

* * * * *